Sept. 4, 1962 A. H. BOBECK 3,052,873

MAGNETIC MEMORY CIRCUITS

Filed Sept. 18, 1958

INVENTOR
A. H. BOBECK
BY William H. Kamstra
ATTORNEY

United States Patent Office 3,052,873

Patented Sept. 4, 1962

3,052,873

MAGNETIC MEMORY CIRCUITS

Andrew H. Bobeck, Chatham, N.J., assignor to Bell Telephone Laboratories, Incorporated, New York, N.Y., a corporation of New York Filed Sept. 18, 1958, Ser. No. 761,841
7 Claims. (Cl. 340—174)

This invention relates to information storage circuits and more particularly to magnetic memory elements adapted for use in such circuits and methods for their manufacture.

Magnetic memory devices employing magnetic cores of toroidal shape with rectangular hysteresis loops are well known and have advantageously found wide application wherever information of a binary nature must be permanently or temporarily stored. One binary value is usually associated with one of the remanent magnetic states to which such a core can be driven and the other binary value with the other remanent state. Such cores have found wide application, for example, in the computer and data processing fields. In devices employing a large number of such cores, space is often a critical factor and it is frequently advantageous to use a magnetic core structure which is simpler and more compact than one composed of numerous cores separately mounted. One such structure, for example, is the sheet of magnetic material containing a plurality of apertures or holes, as described in the copending application of R. L. Ashenhurst and R. C. Minnick, Serial No. 401,465, filed December 31, 1953, now Patent 2,912,677, issued November 10, 1959. The cores are there defined by the holes formed in a magnetic sheet of a material possessing a substantially rectangular hysteresis loop. Magnetic cores thus defined may replace the prior art toroids in the various types of circuits, well known in the art, wherein toroids have previously been used. Unlike a toroid, a core defined by a hole in such a plate does not have a clearly definable abount of magnetic material associated with it. Therefore, although the field required to saturate a toroidal core can be readily ascertained, this may prove difficult for a core defined by a hole in a plate.

In circuits employing toroids for the storage of binary information, switching is conventionally accomplished by the application of currents to drive windings inductively coupled to the toroid. The circuit parameters are advantageously such that the coercive force of the entire toroid is exceeded by the magnetomotive force developed by the switching current in order to obtain fast and complete switching of the toroid. With a hole type magnetic core array, however, the application of driving currents does not quickly switch a discrete core area as in a toroidal type since an indefinite amount of magnetic material defines the hole type core. As is well known, the magnetic field about a current carrying conductor is inversely proportional to the distance from the conductor; accordingly, the magnetic material surrounding the hole type core will be switched out to a point where the magnetic field is just equal to the coercive force. The material at this latter point would theoretically be switched only after an infinite time duration. Thus, the currents used to switch a hole type core will switch the material near to the hole rapidly and that further from the hole progressively more slowly. As a result, better discrimination between a "1" and a "0" stored in such a core could be accomplished if the flux reversal in the radial direction were limited to a certain discrete area.

If the holes in a hole type array are spaced so that the normal switching current applied to any core will not interfere with the remanent state of the material comprising the adjacent core, there will be areas of the sheet which are never switched and which are essentially unmagnetized. These areas increase the inductance of the sheet and thereby increase the power requirements of the array. More important, these areas are subject to any stray magnetic fields and, if magnetized, can prevent satisfactory operation of the circuit by effectively blocking flux flow about some of the cores. This blocking action is a familiar problem also encountered in other well-known magnetic flux control arrangements. When these areas become magnetized and interfere with the operation of the circuit, the entire sheet must frequently be demagnetized before satisfactory operation can be resumed. Also, with the hole type array, the overdriving of any particular core can interfere with the information stored in adjacent cores.

Accordingly, it is an object of this invention to limit to a discrete area the flux reversal about the cores of hole type magnetic core arrays.

It is a further object of this invention to reduce the possibility of flux flow about the cores of a hole type array being blocked by the accidental magnetization of intercore areas of the array.

Another object of this invention is to permit the use of driving currents which would overdrive the cores of known hole type arrays and which would interfere with the information stored in adjacent cores in such arrays.

A still further object of this invention is to permit more extensive utilization of hole type magnetic core structures.

Yet another object of this invention is to enable the generation of faster output pulses by cores of a hole type array than has hitherto been possible.

The foregoing and other objects are realized according to the principles of this invention in one illustrative embodiment thereof comprising a homogeneous ferrite sheet of uniform chemical composition containing a plurality of holes or apertures, a small area around each hole having been subjected to a greater pressure than the remainder of the sheet during the processing of the sheet. The magnetic properties of a fired ferrite are sensitive to pressure and by applying one pressure to the area around each hole and a different pressure to the rest of the sheet, different properties can be imparted to these areas. Thus, in this manner the area around the holes can be made to have substantially rectangular hysteresis loop characteristics and at the same time to require a relatively low coercive force while the remainder of the sheet can be made to have substantially nonrectangular hysteresis characteristics and to require a relatively high coercive force. In this way only a small area around each hole will be switched, and a faster switching pulse and better selection discrimination can be obtained than with an ordinary apertured plate. Thus, the extent of flux reversal about each core is constrained by the establishment of preferred flux paths about each core. The magnetic properties of the material between the holes will also reduce the possibility of this material taking on a permanent magnetization and thereby interfering with the operation of the array.

According to a second embodiment of this invention, a number of multi-hole or flux-limited devices are formed on a single sheet of homogeneous ferrite material. Thus, a number of flux-limited devices such as the three hole device described in the copending application of J. L. Rogers, Serial No. 675,388, filed July 31, 1957, now Patent No. 2,926,342 issued February 23, 1960, may be formed on one plate by applying a preferential amount of pressure on the area immediately surrounding each three hole group. Since a flux-limited device imposes certain limiting dimensions on the flux carrying portions of the device, sheets constructed according to the principles of this invention constitute an extremely advantageous means for enabling many of such devices to be formed on a single sheet. The formation of a number of flux-limited devices on a single plate has hitherto been impractical because of the incidental flux paths made available by the connecting portions of the plate.

Accordingly, one feature of this invention is an integral apertured ferrite memory plate in which the material surrounding each aperture has magnetic properties different from those of the remainder of the plate.

It is another feature of this invention that an integral apertured ferrite memory plate have discrete portions surrounding each of the apertures, which portions have a material density exceeding that of the remainder of the plate.

A further feature of this invention is an apertured memory plate particular effective cores of which are flux linked by integral portions of the plate having magnetic properties distinct from the remainder of the plate.

It is still another feature of this invention that flux-limited paths are established in an integral apertured ferrite memory plate by differentiating pressures applied to the plate during its manufacture.

A complete understanding of this invention and of the above and other objects and features thereof may be gained from a consideration of the following detailed description together with the accompanying drawing in which.

Figure 1:
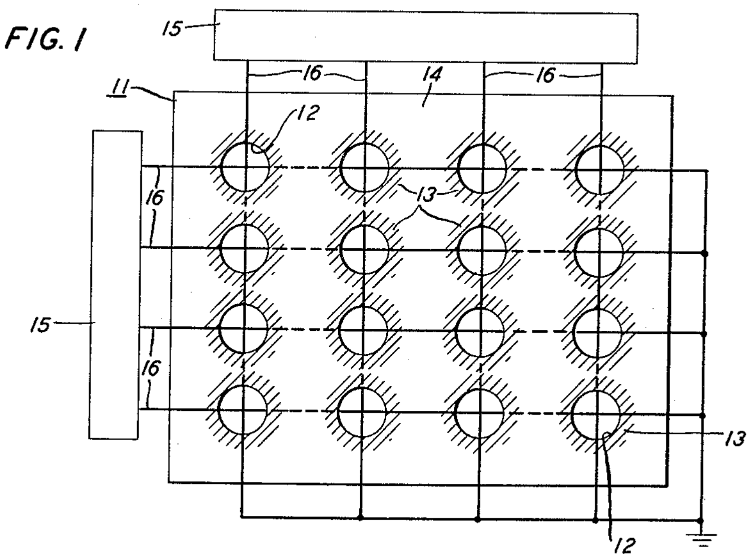
FIG. 1 depicts one specific illustrative apertured magnetic memory plate according to the principles of this invention.

In FIG. 1 there is shown a plate 11 of a homogeneous ferrite material of uniform chemical composition having a plurality of apertures 12 therein. A core area 13, shown as shaded in the drawing for purposes of description, surrounding each aperture has been subjected to a preferential pressure during formation of the plate, which pressure is greater than that applied to the remaining area 14 of the plate. Coordinate energizing conductors 16 connected between row and column current sources 15 and ground are shown threading each of the apertures 12 and are provided herein only to illustrate the application of this invention in a conventional coincident current array. Other conductors, such as output conductors, for example, may also be understood as being present in specific applications of this invention.

Figure 3:
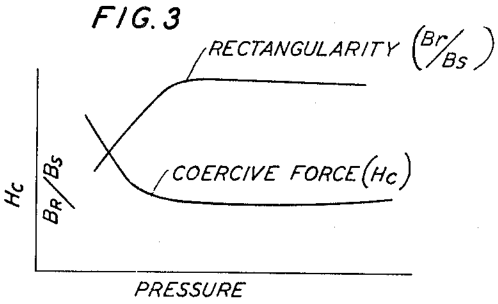
FIG. 3 is a graph depicting the relationship of coercive force and hysteresis loop rectangularity as against pressure in a typical magnetic material.

The properties of a fired ferrite material have been found to be sensitive to the amount of pressure applied during the formation of the material. This known sensitivity is graphically illustrated in FIG. 3 where the rectangularity of the hysteresis characteristic loop of the ferrite material determined as $B_r/B_s$, where $B_r$ is the flux density at remanence and $B_s$ is the flux density at saturation, and the coercive force $H_c$ both are shown as functions of pressure. Thus, if the pressure applied to the plate area 14 is just sufficient to form this portion of the plate and the pressure applied to the core areas 13 surrounding the apertures is of a suitably greater magnitude, the core areas 13 will have properties different from those of the plate area 14. In this manner the areas 13 can be made to require a lower coercive force and to have more rectangular hysteresis loop characteristics than the area 14. The flux surrounding each hole 12 during operation of the array can in this manner be limited to the preferentially pressed area 13 surrounding the holes. A switching current in conductors 16 inductively coupled to the areas 13 may thus be large enough to switch the entire area 13 rapidly without fear of switching any of the plate material exterior to the area 13.

The area 14 not only will not be affected by the switching currents in the conductors 16 threading the apertures 12 but, since it requires a large coercive force, will, for practical purposes, not be magnetically affected by stray fields. As a result, flux flow about the apertures will not be blocked as would be the case in the interaperture area of an ordinary hole type array. In any event, should the area 14 somehow be driven to saturation by a large stray field, the entire sheet would not have to be demagnetized before operation could be resumed. The area 14 has sufficiently nonrectangular hysteresis characteristics such that the blocking of flux flow about any aperture may readily be remedied simply by applying currents to overdrive the blocked apertures.

Another method by which the area 13 may be given magnetic properties different from those of the area 14 is the application of a magnetically contaminating substance to the area 14 during the formation of the plate 11 which causes this area to have substantially nonrectangular hysteresis characteristics and also to acquire a higher coercive force than the areas 13.

Figure 2:
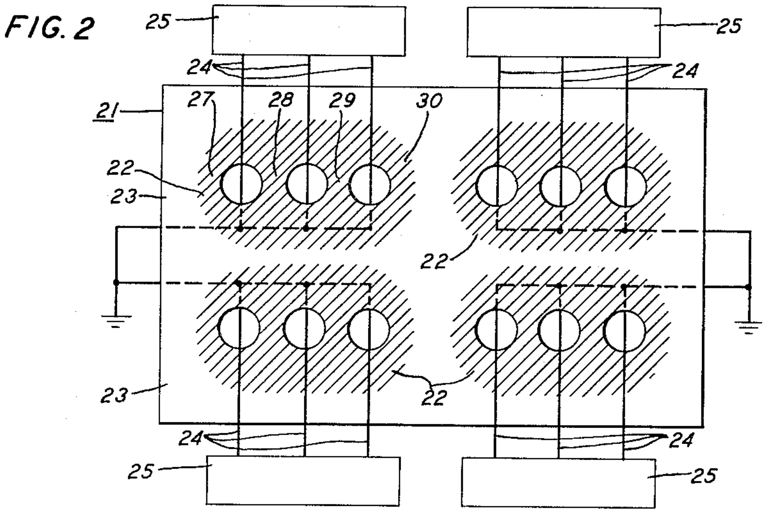
FIG. 2 depicts another specific illustrative magnetic memory plate arrangement.

Another illustrative embodiment of this invention utilizes the linking of flux between any selected apertures to provide, for example, some predetermined pattern of switching. Thus, for example, as shown in FIG. 2, the principles of this invention can be applied to form on a single ferrite sheet a number of the devices described in the patent of J. L. Rogers, previously cited. In FIG. 2 is shown a ferrite plate 21 comprising a plurality of flux-limited three hole devices 22, also shown as shaded in the drawing, the area included in each device 22 having been subjected to a preferential pressure during the formation of the plate different from, and, in this embodiment, greater than, that applied to the remaining area 23 of the plate 21. Conductors 24 which are connected between various operating current pulse sources and ground are shown threading each of the holes of the devices 22 and are arranged illustratively. A detailed description of the current sources is not necessary for a consideration of the principles of this invention; accordingly, the sources contemplated in the cited copending application are here represented only by single block symbols 25. Obviously any wiring arrangement may be realized depending upon the specific storage operations to be performed.

As described previously, the application of preferential pressure constrains the flux surrounding the apertures of the devices 22 to the portion of the plate 21 included in the operative grouping of cores. The connecting area 23 accordingly advantageously presents a magnetically isolating structure whereby the individual devices 22 are coordinated. In flux-limited devices the path through which flux flows is of a critical dimension. Each of the three hole devices 22 of FIG. 2 has four legs or paths, such as the legs 27, 28, 29, and 30 of approximately equal dimensions and two side portions each of a cross-sectional area approximately twice that of each of the legs. The relative dimensions of the legs and sides are critical; plates according to the principles of this invention, therefore, represent a highly advantageous means by which a plurality of multi-hole or flux-limited devices can be formed on a single ferrite plate. Obviously methods of contaminating the areas 23 such as the one previously described to achieve the difference in magnetic properties may also be used in connection with the embodiment of FIG. 2.

What have been described are considered to be only illustrative embodiments according to the principles of the present invention and it is to be understood that numerous other arrangements may be devised by one skilled in the art without departing from the spirit and scope thereof.

What is claimed is:

1. A magnetic memory element comprising a magnetic plate of ferrite material of substantially uniform chemical composition having a plurality of apertures therein, discrete portions of said plate about said apertures having hysteresis characteristics substantially more rectangular having a coercivity substantially lower than the remainder of the plate, said discrete portions also having a material density exceeding that of said remainder of said plate.

2. A magentic memory device comprising a magnetic plate of ferrite material of substantially uniform chemical composition having magnetic characteristics represented by a first hysteresis loop, discrete portions of said plate about said apertures having a material density exceeding that of other portions of said plate such that said discrete portions have magnetic characteristics represented by a substantially rectangular second hysteresis loop, and means including conductors threading said apertures for inducing particular remanent magnetization in said discrete portions.

3. A magnetic memory device comprising a magnetic plate of ferrite material of substantially uniform chemical composition having a plurality of apertures therein defining a plurality of magnetic cores, means for flux linking a particular group of said cores comprising a zone of said material including said group of cores, said zone having a lower coercivity and more rectangular hysteresis characteristics than the remainder of said plate, said zone also having a material density exceeding that of said remainder of said plate.

4. A magnetic memory element comprising a magnetic plate of ferrite material of substantially uniform chemical composition having particular hysteresis characteristics such that said material exhibits magnetic remanence, said plate having a plurality of apertures therein, inductive means for inducing a magnetic flux in said plate, and means for controlling said flux within predetermined patterns about said apertures comprising zones of said material defining said patterns having a material density greater than the remainder of said plate, such that said material of said zones has particular hysteresis characteristics substantially more rectangular than said hysteresis characteristics of the remainder of said plate.

5. A magnetic memory device comprising a magnetic plate of ferrite material of substantially uniform chemical composition having apertures therein, means including current pulse source means and conductors threading said apertures for inducing a magnetic flux in said plate, and means for confining said flux to discrete portions of said plate comprising zones of said material about said apertures having a lower coercivity and more rectangular hysteresis characteristics than the remainder of said plate, the ferrite material in said zones being more closely packed than the material in the remainder of said plate.

6. A magentic core memory structure comprising a plate of ferrite material of substantially uniform chemical composition exhibiting magnetic remanence, said plate having at least one aperture therein and flux-limiting means in said plate comprising a discrete zone of said material including said aperture having a lower coercivity than the remainder of said plate, the ferrite material in said zone being more closely packed than the material in the remainder of said plate.

7. A magnetic core memory structure comprising a plate of a substantially homogeneous ferrite material having magnetic characteristics represented by a first hysteresis loop, said plate having at least one aperture therein, and flux-limiting means in said plate comprising a discrete zone of said material including said aperture having a greater material density than the remainder of said plate for causing magnetic characteristics represented by a substantially rectangular second hysteresis loop.

References Cited in the file of this patent

UNITED STATES PATENTS

| | | |
|---|---|---|
| 1,991,143 | Ehlers | Feb. 12, 1935 |
| 2,825,891 | Duinker | Mar. 4, 1958 |
| 2,870,433 | Simpson | Jan. 20, 1959 |
| 2,877,540 | Austen | Mar. 17, 1959 |
| 2,878,463 | Austen | Mar. 17, 1959 |
| 2,882,519 | Walentine et al. | Apr. 14, 1959 |

FOREIGN PATENTS

| | | |
|---|---|---|
| 1,156,747 | France | May 20, 1958 |